(12) United States Patent
Hughes et al.

(10) Patent No.: US 6,264,069 B1
(45) Date of Patent: Jul. 24, 2001

(54) PULSATION DAMPENER FOR BEVERAGE DISPENSERS AND FOUNTAIN EQUIPMENT

(75) Inventors: Robert D. Hughes, Atlanta, GA (US); Jeffrey A. Blansit, San Antonio, TX (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/333,601

(22) Filed: Jun. 15, 1999

(51) Int. Cl.[7] ............................... B67D 5/56; F16L 55/04
(52) U.S. Cl. ........................................ 222/129.1; 138/30
(58) Field of Search ......................... 138/30; 222/129.1, 222/129.2, 129.3, 129.4

(56) References Cited

U.S. PATENT DOCUMENTS

| | | | |
|---|---|---|---|
| 2,261,948 | * 11/1941 | Beach | 138/30 |
| 2,838,073 | * 6/1958 | Mattia et al. | 138/30 |
| 2,875,786 | * 3/1959 | Shelly | 138/30 |
| 3,948,419 | 4/1976 | Polster . | |
| 4,938,396 | 7/1990 | Shannon . | |
| 5,097,989 | 3/1992 | Nakayama . | |
| 5,152,429 | * 10/1992 | Billings | 222/129.2 |
| 5,645,922 | * 7/1997 | Le Rossignol | 138/30 X |
| 5,746,255 | * 5/1998 | Walsh et al. | 138/30 X |
| 5,778,761 | * 7/1998 | Miller | 222/129.1 X |
| 5,890,626 | * 4/1999 | Wolski et al. | 222/129.1 |
| 6,019,254 | * 2/2000 | Kameyama et al. | 222/129.1 |

OTHER PUBLICATIONS

*New Age Industries*, "Technical Reference Guide", Pub. No. 3820896, 1996; pp. 25, 29, 41, 43, 45, 57, 103.

* cited by examiner

*Primary Examiner*—Kenneth Bomberg
(74) *Attorney, Agent, or Firm*—Sutherland Asbill and Brennan LLP

(57) ABSTRACT

A pulsation dampener for beverage dispensers and fountain equipment decreases the irregularities in concentrate flow from a single action pump and volumetric dispensing valve combination within a beverage dispenser. The pulsation dampener includes a tube for functionally connecting a pump to a valve, thus providing a flow line between the pump outlet and the valve inlet. The pulsation dampener can also provide a flow line between other beverage equipment functional modules or equipment installed between the pump and the valve. The tube retains and collects concentrate flow from the pump outlet to maintain a minimum fluid pressure on the valve inlet. A retainer around the tube prevents the internal fluid pressure within the tube from exceeding the maximum elongation stress of the tube material. Clamps at each end of the retainer, secure the retainer around the tube. Connectors between the pump and the tube, and between the tube and valve provide a liquid-tight fitting for the pulsation dampener operating in a beverage dispenser or fountain equipment. Material properties of the tube are compatible with the concentrate preventing chemical attack on the tube material. Elastic properties of the tube and the retainer combine to oppose the internal fluid pressure of the concentrate within the tube, thus creating a minimum fluid pressure at the valve inlet.

34 Claims, 3 Drawing Sheets

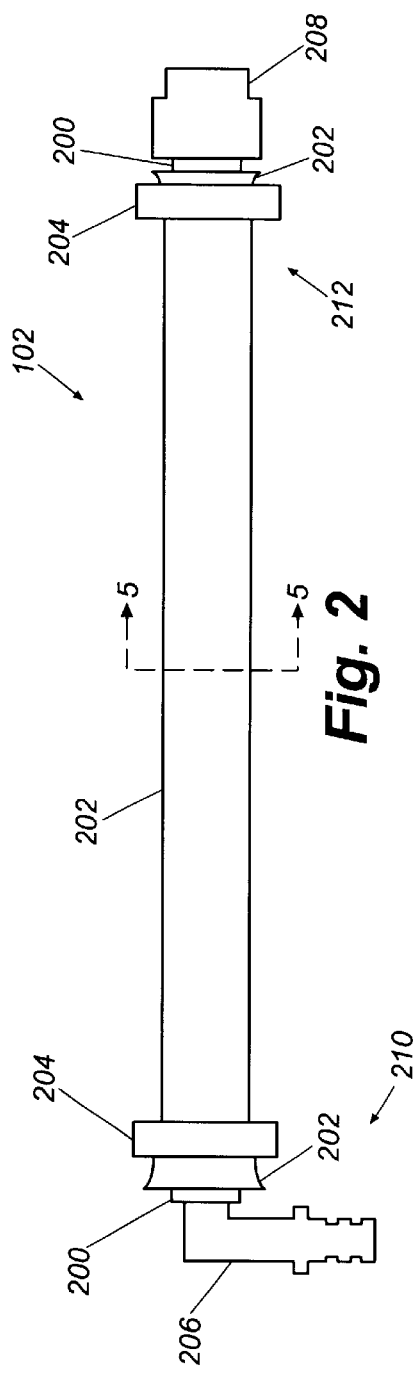
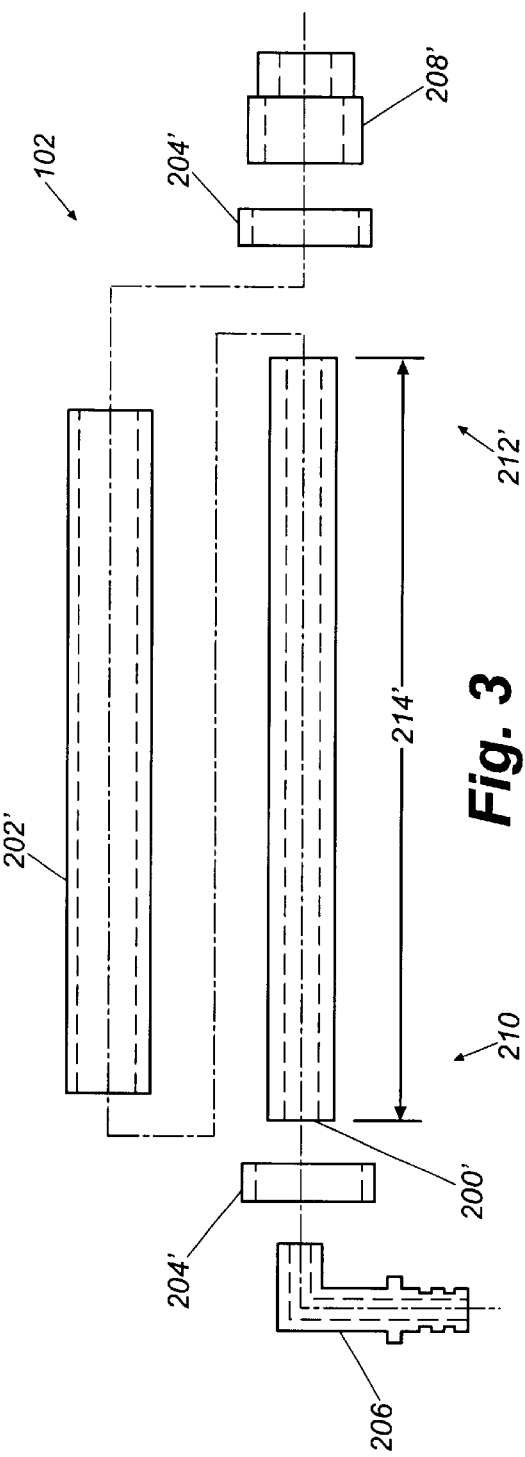

PULSATION DAMPENER FOR BEVERAGE DISPENSERS AND FOUNTAIN EQUIPMENT

TECHNICAL FIELD

The present invention relates generally to the food and beverage industry, and relates more specifically to a pulsation dampener used in beverage dispensing and fountain equipment to dampen or to decrease surges of the flow of a single action pump during the suction cycle.

BACKGROUND OF THE INVENTION

Beverage dispensers and fountain equipment used in the beverage industry are well-known in the art. Generally, beverage dispensers and fountain equipment mix a supply of a concentrate, such as syrup for soft drinks, and a supply of a diluent, such as soda water or plain water. The combined mixture of concentrate and diluent is then simultaneously dispensed into a beverage cup. A proper mixture of concentrate and diluent is essential for the beverage dispenser to serve beverages with consistent quality and taste.

A beverage dispenser may have several functional modules providing different operations and functions. Typically, flow lines connect the different functional modules. Separate storage modules may store the concentrate and the diluent until ready for mixture. When a mixture is required by the beverage dispenser, a pumping module transports concentrate and diluent to a dispensing module. For example, a pump in the beverage dispenser transports concentrate from the storage module to the dispensing module through one or more flow lines between the storage and dispensing modules.

Different types of pumps may be used, for example, a reciprocating single action pump may be used in a beverage dispenser. A reciprocating single action pump has a distinct intake and a distinct output cycle, such that the pump discharges only once for each double stroke of the pump piston or plunger. Thus, in a reciprocating single action pump, the pump forces concentrate through a flow line connected to a suction intake end of the pump during the pump input cycle. The pump then drives the concentrate through an output end of the pump during the pump discharge cycle to the dispensing module. Conversely, in a double action pump, the pump discharges twice during a double stroke of the pump piston or plunger.

The dispensing modules typically use manual or automatic valves to gauge and to regulate the mixture of concentrate and diluent. Volumetric dispensing valves are well known in the art for efficiently metering and distributing the flow of concentrate and diluent for a beverage. For example, a volumetric dispensing valve can dispense a steady pulse of concentrate for a set period of time.

Even though the volumetric dispensing valve has improved the regulation of the flow from the storage module, irregularities in the flow of concentrate can be introduced by combining a volumetric dispensing valve with a reciprocating single action pump. Flow irregularities can be created when the dispensing valve assumes that the concentrate from the reciprocating single action pump is at or above a minimum pressure each time the valve inlet opens. If the concentrate at the valve inlet is not maintained at or above the minimum pressure, the volumetric dispensing valve may introduce irregularities in the flow of concentrate. These irregularities may affect the component ratio of the beverage mixture to be dispensed and the taste of the beverage mixture may not meet consumers' expectations.

Pulsation dampeners, cushion chambers, surge accumulators, and the like may be used to reduce the flow irregularities and to smooth the flow in the suction and/or discharge lines of pumps. Commonly used pulsation dampeners include gas bladders or actuated diaphragms regulating a separate gas chamber.

Lack of space, however, within beverage dispensers and fountain equipment is a disadvantage in using conventional gas bladders and diaphragms as pulsation dampeners in beverage dispensers and fountain equipment. Typically, the functional modules inside beverage dispensers and fountain equipment are compactly sized to fit within operational specifications and size constraints. Conventional gas bladders or diaphragms separating gas chambers would take up valuable space within the beverage dispenser or fountain equipment.

Material incompatibility of conventional gas bladders and diaphragms with the concentrate used in the beverage dispenser further increases the disadvantage of using such conventional bladders or diaphragms as pulsation dampeners. The concentrate tends to corrode or attack the material of conventional gas bladders and diaphragms used as pulsation dampeners. This corrosion may lead to the premature failure of the pulsation dampener. Substantial and costly downtime may result by having to replace failed pulsation dampeners or other equipment affected by the failure of a pulsation dampener in beverage dispenser and fountain equipment.

The food and beverage industry is a highly competitive marketplace for cold beverage suppliers. Cold beverage suppliers rely on beverage dispensers and fountain equipment to dispense soft drinks into drinking cups for sale to customers. Any significant savings in the costs or performance associated with beverage dispensers and fountain equipment would give a beverage supplier a competitive advantage over other beverage suppliers vying for marketshare in the industry.

Thus, there is a need for the improvement of the concentrate flow from a beverage dispenser when a single action pump and volumetric dispensing valve are combined to dispense concentrate.

There is a further need for improvement in the consistency of the delivery for quality dispensed beverages that meet the consumers' expectations for taste.

Further, there is a need for a low cost, easy to manufacture pulsation dampener for a reciprocating single action pump that can be used in compact beverage dispensers and fountain equipment.

And further, there is a need for a materially compatible pulsation dampener for use with concentrates dispensed by beverage dispensers and fountain equipment.

SUMMARY OF THE INVENTION

The present invention solves the problems of the prior art described above. By using a pulsation dampener for beverage dispensers and fountain equipment, irregularities in the concentrate flow can be minimized by maintaining a minimum fluid pressure at the inlet of the dispensing valve. Improvement in the flow of concentrate dispensed by the valve creates a consistent product that meets the consumer's expectations. The low cost, easy to manufacture pulsation dampener creates a cost savings for the beverage dispenser and fountain equipment manufacturer competing in the soft drink marketplace. Further, a pulsation dampener that is compatible with the concentrate used in beverage dispensers and fountain equipment reduces the overall maintenance and operating costs associated with the equipment, thus creating an additional cost savings for the manufacturer or operator.

Generally described, a pulsation dampener for beverage dispensers and fountain equipment provides a flow line between a pump and a dispensing valve. Other beverage dispenser functional modules or equipment may be installed between the pulsation dampener and the pump, or between the pulsation dampener and the dispensing valve. The pulsation dampener maintains a minimum fluid pressure between the pump outlet of a single action pump and the valve inlet of a volumetric dispensing valve by retaining and collecting the concentrate flow from the pump outlet.

When concentrate flows from the pump, the concentrate collects in the tube of the pulsation dampener. The internal fluid pressure of the concentrate within the tube increases until the internal fluid pressure exceeds the elongation stress of the tube material. The tube then expands with the increasing internal fluid pressure until the internal fluid pressure reaches a selected design stress for the pulsation dampener. At the selected design stress, the retainer prevents the tube from further expanding.

The pulsation dampener maintains a minimum fluid pressure at the valve inlet. The elasticity of the tube material provides an opposing force against the internal fluid pressure within the tube. This opposing force creates the fluid pressure at the valve inlet. Thus, the pulsation dampener maintains a fluid pressure at the valve inlet as long as the tube material opposes the internal fluid pressure within the tube.

More particularly described, a pulsation dampener connects a single action pump to a volumetric valve. Other beverage dispenser functional modules or equipment may be installed between the pulsation dampener and the pump, or between the pulsation dampener and the dispensing valve. Flow from the pump outlet collects in the tube of pulsation dampener. The tube expands when the internal fluid pressure exceeds the tube material elongation stress. The tube can continue expanding until the internal fluid pressure reaches a selected design stress for the pulsation dampener, or until the retainer around the tube prevents the tube from further expanding.

When the tube is in its expanded state, the elastic properties of the tube material create a force opposing the internal fluid pressure within the tube. The force acts upon the concentrate within the tube, and provides a pressure at the inlet to the volumetric dispensing valve. Material properties of the tube provide chemical compatibility of the tube with the concentrate, preventing chemical attack of the tube material by the concentrate.

A retainer around the tube prevents the tube from exceeding the maximum elongation stress for the tube material, or a selected design stress less than the maximum elongation stress. Clamps fasten the retainer to the tube. At each end of the retainer and the tube, a clamp holds the retainer tightly against the tube. The clamps prevent the retainer from slipping off the tube.

Connectors at each end of the tube provide functional connections to the pump outlet of the single action pump and to the valve inlet of the volumetric dispensing valve. The connectors provide liquid-tight connections between the pump and the pulsation dampener, and between the pulsation dampener and the valve.

The present invention thus provides a pulsation dampener for beverage dispensers or fountain equipment. The pulsation dampener minimizes irregularities in the flow from the combination of a single action pump and volumetric dispensing valve. The pulsation dampener for beverage dispensers and fountain equipment maintains a constant flow pressure at the valve inlet, thus smoothing out uneven flow to the valve. Other objects, features, and advantages of the present invention will become apparent upon reading the following specification, when taken in conjunction with the drawings and the appended claims.

BRIEF DESCRIPTION OF THE DRAWINGS

FIG. 2 illustrates an unexploded view of a pulsation dampener for a beverage dispenser or fountain equipment.

FIG. 3 illustrates an exploded view of a pulsation dampener as shown in FIG. 2

DETAILED DESCRIPTION OF THE DISCLOSED EMBODIMENT

The invention may be embodied in a pulsation dampener for a beverage dispenser and fountain equipment. The invention dampens the irregularities in concentrate flow from the combination of a single action pump and a volumetric dispensing valve.

Figure 1:
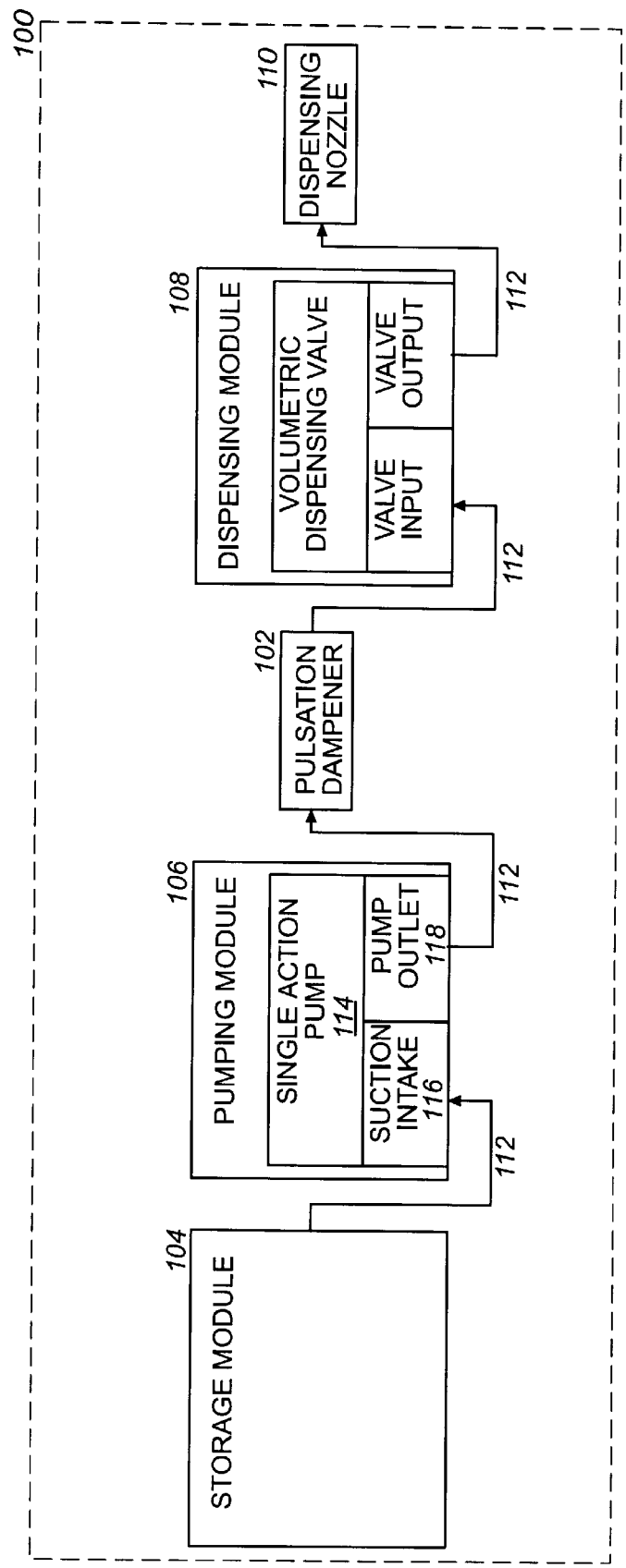
FIG. 1 illustrates a functional block diagram of an illustrative operating environment for a pulsation dampener for beverage dispensers or fountain equipment.

Referring now to the drawings, in which like numerals indicate like elements throughout the several views, FIG. 1 shows a beverage dispenser 100. The beverage dispenser 100 is an illustrative operating environment for a pulsation dampener 102. A suitable beverage dispenser 100 utilizing the pulsation dampener 102 is a Model 600 manufactured by Lancer, Inc. of San Antonio, Tex. Other suitable beverage dispensers include, but are not limited to, Delta, Convertible, and other similar type beverage dispensers and fountain equipment.

Typically, a beverage dispenser or fountain equipment contains several functional modules. For example, in this embodiment, the beverage dispenser 100 contains a storage module 104, a pumping module 106, and a dispensing module 108. The storage module 104 stores concentrate until the beverage dispenser 100 requires an amount of concentrate to prepare a beverage. When concentrate is required by the beverage dispenser 100, the pumping module 106 pumps the concentrate through the pulsation dampener 102 to the dispensing module 108. The dispensing module 108 dispenses concentrate from the storage module 104 to a dispensing nozzle 110. The dispensing nozzle 110 is the endpoint of the beverage dispenser 100 operation for delivery of a beverage to the consumer.

Typically, flow lines connect each functional module together to permit the flow of concentrate between modules. For example, in this embodiment, the storage module 104 and the pumping module 106 are connected together by a flow line 112. Flow lines 112 can be used to connect the pumping module 106 to the pulsation dampener 102, to connect the pulsation dampener 102 to the dispensing module 108, and to connect the dispensing module 108 to the dispensing nozzle 110. Other beverage dispenser functional modules or equipment may be installed between the pulsation dampener 102 and the pumping module 106, or between the pulsation dampener 102 and the dispensing module 108. For example, a cooling module (not shown) may be installed between the pulsation dampener 102 and the dispensing module 108. The installation of other beverage dispenser functional modules or equipment does not affect the use or structure of the disclosed pulsation dampener 102.

The pumping module 106 may contain a reciprocating single action pump 114. The pump 114 has a suction intake 116 end and a pump outlet 118 end. When the pump 114 is activated, beginning the pump 114 intake cycle, concentrate from the storage module 104 is forced into the suction intake 116 end of the pump 114 by the suction force generated by the pump 114. When the pump 114 output cycle begins, the pump 114 forces the concentrate out of the pump outlet 116 end to the pulsation dampener 102.

A suitable single action pump 114 for use with the pulsation dampener 102 for a beverage dispenser or fountain equipment is a Minipump manufactured by Lancer, Inc. of San Antonio, Tex. Other single action pumps may be used with the present invention, including, but not limited to, pumps manufactured by the Cornelius Company.

The pulsation dampener 102 connects the pumping module 106 and the dispensing module 108. The pulsation dampener 102 acts as a flow line between the functional modules. The pulsation dampener 102 also collects and retains the flow of concentrate from the pumping module 108 prior to, during, and after operation of the dispensing module 108. By collecting and retaining the flow between the pump outlet 118 and the dispensing module 108, the pulsation dampener 102 provides an opposing force against the internal fluid pressure of the concentrate within the pulsation dampener 102. This opposing force against the concentrate provides the pressure that can be maintained in the pulsation dampener 102 before the concentrate enters the dispensing module 108. Maintaining pressure at the dispensing module 108 is important to the smooth operation of the beverage dispenser 100 and the continuous flow of concentrate to the dispensing module 108. The pulsation dampener 102 thus minimizes irregularities in the concentrate flow by smoothing out uneven flow from the dispensing module 108. The pulsation dampener 102 is further described below in FIGS. 2–6.

A volumetric dispensing valve 120 in the dispensing module 108 regulates the amount of concentrate that is dispensed by the dispensing module 108. The volumetric dispensing valve 120 has a valve input 122 end and a valve output 124 end. Concentrate from the pulsation dampener 102 flows into the valve input 122 end of the volumetric dispensing valve 120. When an amount of concentrate is required by the beverage dispenser 100, the volumetric dispensing valve 120 dispenses the required amount through the valve output 122 end to the dispensing nozzle 110. The concentrate flow is mixed within the dispensing nozzle 110 to create a beverage for the consumer.

Because the pulsation dampener 102 maintains a minimum pressure of concentrate at the valve input 122 end, the volumetric dispensing valve 120 provides a consistent and accurate regulated flow of concentrate to the dispensing nozzle 110. If the concentrate flows at a low pressure to the volumetric dispensing valve 120, or if an uneven flow of concentrate enters the volumetric dispensing valve 120, irregularities in the flow dispensed from the valve 120 may occur.

A suitable volumetric dispensing valve 120 for use with the pulsation dampener 102 for a beverage dispenser or fountain equipment is the Volumetric Valve manufactured by Lancer, Inc. of San Antonio, Tex. Other volumetric dispensing valves may be used with the present invention, including, but not limited to, those disclosed by commonly owned U.S. Pat. No. 5,381,926 and pending application Ser. No. 09/245,594, the disclosure of which are incorporated herein by reference.

FIG. 2 illustrates an unexploded view of the pulsation dampener 102 for beverage dispensers and fountain equipment. FIG. 3 shows an exploded view of a pulsation dampener assembly. As shown in FIGS. 2–3, the pulsation dampener 102 for a beverage dispenser or fountain equipment may include a tube 200, 200', a retainer 202, 202', clamps 204, 204', a pump-to-tube connector 206, 206', and a tube-to-valve connector 208, 208'.

The tube 200, 200' fits inside the retainer 202, 202'. The pump-to-tube connector 206, 206' is inserted into one end of the tube 200, 200', and the tube-to-valve connector 208, 208' is inserted into the opposing end of the tube 200,200'. A clamp 204, 204' is placed around each end of the retainer-tube assembly, and then each clamp 204, 204' is firmly secured around the retainer 202, 202' to hold the tube 200, 200' and the retainer 202, 202'together.

The tube 200, 200' provides a flow path for concentrate in the beverage dispenser or fountain equipment. The tube has a pump end 210, 210' and a valve end 212, 212'. Concentrate enters the pump end 210, 210' of the tube 200, 200' from the pump outlet (shown in FIG. 1 as 118) of the single action pump (shown in FIG. 1 as 114). The concentrate flows through the tube 200, 200' to the valve end 212, 212' of the tube 200, 200' and enters the valve input (shown in FIG. 1 as 122) of the volumetric dispensing valve (shown in FIG. 1 as 120).

To maintain a minimum pressure at the valve input 122 of the volumetric dispensing valve 120, the tube 200, 200' collects and retains the concentrate flowing from the single action pump 114 to the volumetric dispensing valve 120. When concentrate collects in the tube 200, 200', the concentrate exerts an internal fluid pressure within the tube 200, 200'. When the internal fluid pressure exceeds the tube 200, 200' material elongation stress, the tube 200, 200' expands to accommodate the internal fluid pressure. The elasticity of the tube 200, 200' material provides an opposing force to the internal fluid pressure created by the concentrate within the tube 200, 200'. This opposing force creates the pressure on the concentrate within the tube 200, 200' of the pulsation dampener 102.

Suitable materials for a tube 200, 200' used for pulsation dampener 102 in a beverage dispenser 100 or fountain equipment can operate at internal fluid pressures of approximately 60–100 psi. For example, a suitable material for a tube 200, 200' is silicone. The tube 200, 200' can be made from other materials including, but not limited to, viton fluoroelastomer (VITON), latex natural rubber (LATEX), co-extrusions, elastomers, and thermoplastic elastomers, or other similar materials that will contract after being expanded.

An additional consideration for tube 200, 200' material selection is the material compatibility with the type of beverage concentrate, or other substance flowing through the tube 200, 200'. The tube 200, 200' material should be able to withstand chemical attack, such as corrosion, initiated by the concentrate or other fluid flowing in the tube 200, 200'. For example, silicone is a suitable material that is compatible with concentrate flowing at 105° F. as is used to produce a COCA-COLA brand soft drink distributed by or on behalf of the COCA-COLA Company of Atlanta, Ga.

The tube 200, 200' can be any shape or size as long as a functional connection exists allowing concentrate to flow between the reciprocating single action pump 114 and the volumetric dispensing valve 120. A suitable shape for a tube 200, 200' is a conventional hollow silicone tubing. Other shapes for a tube 200, 200' may be used depending upon the characteristics or functional specifications of the pulsation dampener 102.

Suitable dimensions of the tube 200, 200' used in the pulsation dampener 102 for a beverage dispenser 100 or fountain equipment measures approximately ½ inches external diameter, approximately ¼ inches internal diameter, and approximately 12 inches in length. In use, the tube 200, 200' may expand to a external diameter of about ⅝ to ¾ inches. Other sizes of tube may be used depending upon the characteristics or functional specifications of a pulsation dampener 102 for a beverage dispenser or fountain equipment.

Tube retainer 202, 202' prevents the tube 200, 200' from exceeding a selected design stress for the pulsation dampener 102. Typically, a selected design stress for the pulsation dampener 102 can be any elongation stress less than the maximum elongation stress of the tube 200, 200' material. Thus, when concentrate fills the tube 200, 200' and exerts internal fluid pressure on the tube 200, 200', the selected design stress of the retainer 202, 202' material will be attained before the maximum elongation stress of the tube 200, 200' material is reached.

A suitable material for the retainer 202, 202' is polyethylene terephtalate manufactured by McMaster Carr, such as that commonly used to house electrical cable. The retainer 202, 202' can be made from other similar materials including, but not limited to, nylon.

Any shape or size of retainer 202, 202' can be used with the tube 200, 200' as long as the retainer 202, 202' restrains expansion of the tube 200, 200'. The retainer 202, 202' restrains the tube expansion at a selected elongation stress less than the maximum elongation stress of the tube 200, 200' material. A suitable retainer 202, 202' shape is a hollow mesh sleeve.

A suitable retainer 202, 202' size for a retainer shaped like a hollow mesh sleeve is approximately ¹¹⁄₁₆ inches at the outer diameter, approximately ⅝ inches at the inner diameter, and approximately 12 inches in length. Other shapes and sizes for the retainer may be used depending upon the selected design stress or other operating parameters of the pulsation dampener 102, the material of the retainer 202, 202', and the size or shape of the tube 200, 200' selected for the pulsation dampener 100.

Clamps 204, 204' securely fasten around the circumference of the retainer 202, 202' to hold the ends of the retainer 202, 202' tightly to the ends of the tube 200, 200'. The clamps 204, 204' may include, but not limited to, band clamps, ring clamps, hose clamps, worm gear clamps, ear clamps, or any other device used for tightly securing the circumference of the retainer 202, 202' around the circumference of the tube 200, 200'. For example, the clamps 204, 204' can be placed around the circumference of a retainer-tube assembly, such as a tube inside a hollow mesh sleeve retainer. Suitable clamps 204, 204' for holding the ends of a hollow mesh sleeve retainer around the ends of a tube are 304 AISI stainless steel OETIKER One Ear Stepless clamps, Oetiker part number 15.7, manufactured by Oetiker, Inc.

Connectors 206, 206', 208, 208' attach the pulsation dampener 102 to the pump outlet 118 and to the valve input 122. For example, conventional quick release connectors or fittings may connect the tube 200, 200' of the pulsation dampener 102 to the pump outlet 118 of the reciprocating single action pump 114 and to the valve input 122 of the volumetric dispensing valve 120. The connectors 206, 206', 208, 208' are sized to prevent leakage from the ends of the tube 200, 200' when the connectors 206, 206', 208, 208' are functionally attached to the pump 114 and the valve 120. For example, suitable connectors or fittings are made by Lancer, Inc. of San Antonio, Tex. A suitable pump-to-tube connection 206, 206' is a 90 degree elbow connector is manufactured by Lancer, Inc. A suitable tube-to-valve connection 208, 208' is also manufactured by Lancer, Inc.

Other types of connectors may be used with the pulsation dampener 102 depending upon the beverage dispenser functional modules or equipment that is installed between the pulsation dampener 102 and the pump outlet 118 or between the pulsation dampener 102 and the valve input 122. For example, a suitable connector should be selected to connect the tube 200, 200' of the pulsation dampener 102 to a cooling module installed between the pulsation dampener 102 and the valve input 122 of the volumetric dispensing valve 120.

Figure 4:
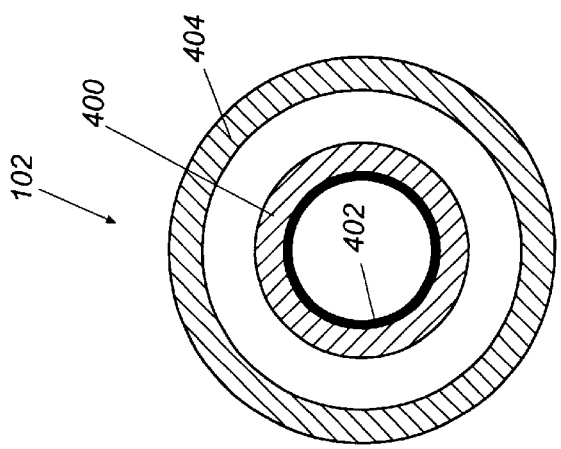
FIG. 4 illustrates another embodiment of a pulsation dampener for a beverage dispenser or fountain equipment.

FIG. 4 illustrates another embodiment for a pulsation dampener 102. In this embodiment, the tube 400 for incorporates a material liner 402 into the tube 400. The liner 402 is materially compatible with the beverage concentrate, or other fluid flowing through the tube 400, so as to withstand chemical attack or corrosion. A retainer 404 encloses the circumference of the tube 400 to prevent the tube 400 from expanding beyond a selected design stress.

For example, conventional co-extrusion processes can bond two or more tubes together concentrically to create a single tube lined with one or more smaller tubes. The smaller tubes can incorporate materials, such as silicone, designed to withstand chemical attack from the concentrate used in beverage dispensers and fountain equipment. Tubes manufactured in this manner are called co-extrusions. Use of a co-extrusion process permits a liner tube 402 compatible with the concentrate to be used with an outer tube 400 that is not compatible with the concentrate to form the tube 400 to be used as pulsation dampener 102 for a beverage dispenser 100 and fountain equipment.

Figure 5:
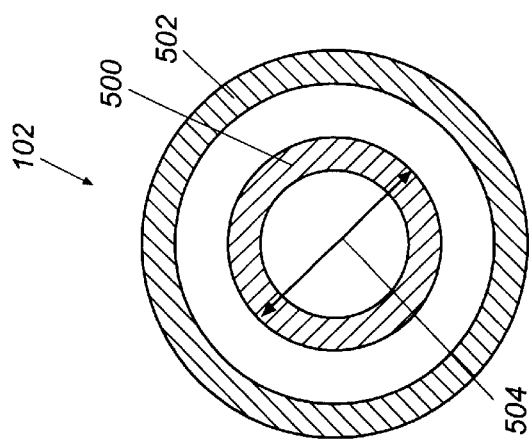
FIG. 5 illustrates a cross-sectional view of a pulsation dampener as shown in FIG. 2.

FIG. 5 illustrates cross-sectional view 5—5 from FIG. 1 of an unexpanded tube 500 inside a retainer 502 of the pulsation dampener 102. The retainer 502 is shaped like a sleeve to fit substantially around the outer diameter 504 of the tube 500 as shown in FIG. 5. The retainer 502 fits concentrically around the outer diameter 504 of the tube 500 along the length (shown in FIG. 3 as 214') of the tube 500. The tube 500 remains in an unexpanded state before concentrate enters the tube 500 from the single action pump 114 (shown in FIG. 1). After concentrate enters the tube 500, the tube 500 remains in an unexpanded state until the internal volume 506 of the tube 500 is completely filled with concentrate, that is, when the internal fluid pressure increases beyond the tube material elongation stress causing the tube 500 material to deform and to elongate.

Figure 6:
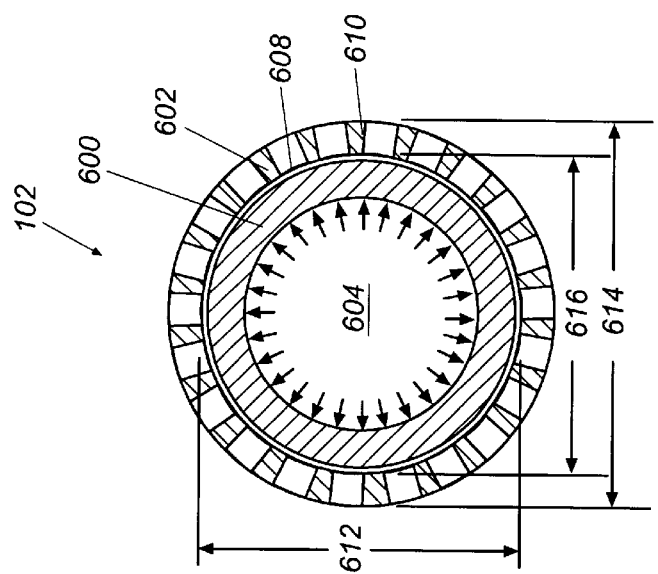
FIG. 6 illustrates a cross-sectional view of a pulsation dampener as shown in FIG. 2

FIG. 6 shows a cross-sectional view of an expanded tube 600 inside the retainer 602 of the pulsation dampener 102. The tube 600 expands when the internal volume 604 of the tube 600 is filled with concentrate from the single action pump 114 (shown in FIG. 1) and additional concentrate continues to be pumped into the pulsation dampener 102. When the internal fluid pressure (shown as arrows) 606 within the tube 600 exceeds the tube 600 material elongation stress, the tube 600 material deforms or elongates. The deformation or elongation of the tube 600 material causes the tube 600 to expand to accommodate the internal fluid pressure 606 of the concentrate within the tube 600. Opposing forces to the internal fluid pressure 606 are created by the elasticity of the tube 600 material. These opposing forces on the concentrate within the tube 600 create the pressure at the valve input 122 (shown in FIG. 1). Selection of a suitable tube 600 material permits the tube 600 to expand and contract to accommodate the increasing and decreasing internal fluid pressure 606 of the concentrate within the internal volume 604 of the tube 600.

Tube 600 expansion continues until the internal fluid pressure 606 reaches a selected design stress for a pulsation dampener 102. When the tube 600 expands to the selected design stress for the pulsation dampener 102, the retainer 602 around the tube 600 prevents the tube 600 from further expanding. The physical constraints of the retainer 602 around the tube 600 prevent the tube 600 from expanding beyond the selected design stress for the pulsation dampener 102. When the tube 600 has expanded such that the outer surface 608 of the tube 600 is in substantial contact with the inner surface 610 of the retainer 602, then the material properties of the retainer 602 control any further expansion of the tube 600.

The retainer 602 material can be designed to deform or elongate as the tube 600 expands with the increasing internal fluid pressure 606 within the tube 600. After the internal fluid pressure exceeds the tube 600 material elongation stress, the retainer 602 material can also expand with the expanding tube 600. When the retainer 602 expands to accommodate the tube 600, the inner surface 610 of the retainer 602 is substantially in contact with the outer surface 608 of the tube 600. Any elastic properties of the retainer 602 material contribute to the opposing forces of the tube 600 material against the internal fluid pressure 606 within the tube 600. Until the internal fluid pressure 606 against the tube 600 and retainer 602 reaches the selected design stress for the pulsation dampener 102, the tube 600 expands up to the selected elongation stress of the tube 600 material. Thus, the retainer 602 prevents the tube 600 from exceeding the selected elongation stress without the retainer 602 material exceeding its own maximum elongation stress.

When the volumetric dispensing valve 120 (shown in FIG. 1) activates and concentrate from the tube 600 enters the valve input 122 (shown in FIG. 1), the internal fluid pressure 606 inside the tube 600 decreases and the tube outer diameter 612 decreases. As the tube outer diameter 612 decreases, the expanded tube 600 material and the expanded retainer 602 material contract like a spring and the retainer outer diameter 614 decreases with the decreasing tube outer diameter 612. When the tube outer diameter 612 decreases below the contracted retainer inner diameter 616, the tube outer surface 608 is no longer in substantial contact with the retainer inner surface 608. That is, the retainer 602 material no longer contracts as the retainer 602 reaches its contracted retainer inner diameter 616. The tube 600 material continues to contract until the tube 600 reaches its contracted tube outer diameter 612.

In the embodiment shown, the retainer 602 is shaped like a hollow mesh sleeve where the retainer inner diameter 616 is greater than the tube outer diameter 612 when there is no substantial contact between the is retainer inner surface 610 and the tube outer surface 608. When the retainer 602 material is shaped into a hollow mesh sleeve, the material acts like a spring around a tube inserted into the mesh sleeve, contracting the tube 600 when the outer diameter of the tube 600 expands to at least the size of the interior diameter of the hollow mesh sleeve. The size and material of the retainer 602 limits the expansion of the tube 600 so that the internal fluid pressure 606 within the tube 600 does not exceed the maximum elongation stress of the tube 600 material.

An alternative embodiment applies a layer of relatively elastic material to a tube in its original, unexpanded state. The layer of elastic material is applied to the tube outer surface 608. The layer of elastic material acts a retainer 602, where the elastic material expands and contracts with the expansion and contraction of the tube 600. When concentrate enters the tube 600 and the internal fluid pressure 606 exceeds the tube 600 material elongation stress, the tube 600 deforms and elongates. When the tube 600 expands, the layer of elastic material expands. The layer of elastic material expands to a selected design stress for the pulsation dampener 102, and then the layer of elastic material prevents the tube 600 material from further expanding. When the internal fluid pressure 606 within the tube 600 decreases to the tube 600 material elongation stress, the layer of elastic material contracts until the tube 600 retains its original state. As the internal fluid pressure 606 decreases below the tube 600 material elongation stress, and the tube 600 retains its original, unexpanded state, the layer of elastic material returns to its own original, unexpanded state.

Given the preceding examples, those skilled in the art will appreciate the many other pulsation dampener configurations and designs that may be employed to practice the present invention. By using a pulsation dampener for beverage dispensers and fountain equipment, irregularities in the concentrate flow can be minimized by maintaining a minimum fluid pressure at the inlet of the dispensing valve. Improvement in the flow of concentrate dispensed by the valve creates a consistent product that meets the consumer's expectations. The low cost, easy to manufacture pulsation dampener creates a cost savings for the beverage dispenser and fountain equipment manufacturer competing in the soft drink marketplace. Further, a pulsation dampener that is compatible with the concentrate used in beverage dispensers and fountain equipment reduces the overall maintenance and operating costs associated with the equipment, thus creating an additional cost savings for the manufacturer or operator. It will be understood that throughout this specification the invention has been disclosed by way of example, and that other modifications may occur to those skilled in the art without departing from the scope and spirit of the invention defined by the following claims.

The invention claimed is:

1. An apparatus for dampening pulsations in a fluid flow from a pump outlet to an inlet of a valve in a beverage dispenser, comprising:

a tube for collecting and retaining fluid;
the tube capable of expanding when the fluid pressure increases within the tube;
one end of the tube capable of receiving fluid from a pump outlet and an opposing end of the tube capable of delivering fluid to the inlet of the valve; and
a retainer positioned around the tube for restricting expansion of the tube when the fluid pressure expands the tube, said retainer providing the sole manner by which the tube is restricted from expansion.

2. The apparatus of claim 1, further comprising:
at least one clamp around the retainer holding the retainer to the tube.

3. The apparatus of claim 1, further comprising:
an end connection attached to one end of the tube to connect the tube to the pump.

4. The apparatus of claim 1, wherein the tube is selected from the group consisting of a round, oval, square, or polygonal cross-section.

5. The apparatus of claim 3, further comprising:
an end connection attached to the opposing end of the tube to connect the tube to the valve.

6. The apparatus of claim 1, wherein the retainer comprises a hollow mesh sleeve.

7. The apparatus of claim 1, wherein the tube is selected from the group consisting of latex rubber, silicone rubber, elastomer, thermoplastic elastomer, or viton flouroelastomer.

8. The apparatus of claim 1, wherein the tube comprises a coextrusion.

9. The apparatus of claim 1, wherein the retainer comprises polyethylene terephthalate.

10. The apparatus of claim 1, wherein the retainer comprises nylon.

11. In combination, an apparatus for dampening pulsations in a fluid flow between an outlet of a single action pump and an inlet of a volumetric dispensing valve in a beverage dispenser, comprising:
a tube for containing and retaining the fluid,
one end of the tube connected to the pump outlet and an opposing end of the tube connected to the inlet of the valve;
the tube capable of expanding when fluid pressure increases within the tube;
a retainer positioned around the tube to limit maximum fluid pressure expansion of the tube when the fluid is contained and retained within the tube, said retainer providing the sole manner by which the tube is restricted from expansion;
at least one clamp around the retainer holding the retainer around the tube;
an end connection connecting one end of the tube to the outlet of the single action pump; and
an end connection connecting the opposing end of the tube to the inlet of the volumetric dispensing valve.

12. The apparatus of claim 11, wherein the tube comprises latex rubber, silicone rubber, elastomer, thermoplastic elastomer, or viton flouroelastomer.

13. The apparatus of claim 11, wherein the tube comprises a coextrusion.

14. The apparatus of claim 11, wherein the retainer comprises polyethylene terephthalate.

15. The apparatus of claim 11, wherein the retainer comprises nylon.

16. The apparatus of claim 11, wherein the tube is selected from the group consisting of a round, oval, square, or polygonal cross-section.

17. The apparatus of claim 11, wherein the retainer comprises a hollow mesh sleeve.

18. A beverage dispenser comprising:
a single action pump;
a valve;
a pulsation dampener connected between the single action pump and the valve;
the pulsation dampener further comprising,
a tube for collecting and retaining a flow; and
a retainer for limiting the tube, said retainer providing the sole manner by which the tube is restricted from expansion expansion.

19. The beverage dispenser of claim 18, wherein the valve is a volumetric dispensing valve.

20. The beverage dispenser of claim 18, wherein the tube is selected from the group consisting of rubber, silicone rubber, elastomer, thermoplastic elastomer, or viton flouroelastomer.

21. The beverage dispenser of claim 18, wherein the tube comprises a coextrusion.

22. The beverage dispenser of claim 18, wherein the retainer comprises polyethylene terephthalate.

23. The beverage dispenser of claim 18, wherein the retainer comprises nylon.

24. The beverage dispenser of claim 18, wherein the tube is selected from the group consisting of a round, oval, square, or polygonal cross-section.

25. The beverage dispenser of claim 18, wherein the retainer comprises a hollow mesh sleeve.

26. A beverage dispenser comprising:
a single action pump with an outlet;
a pulsation dampener connected to the outlet; and,
a valve with an inlet connected to the pulsation dampener,
the pulsation dampener further comprising,
a tube for collecting and retaining a flow; and
a retainer for limiting the tube expansion, said retainer providing the sole manner by which the tube is restricted from expansion.

27. The beverage dispenser of claim 26, wherein the valve is a volumetric dispensing valve.

28. The beverage dispenser of claim 26, wherein the tube is selected from the group consisting of rubber, silicone rubber, elastomer, thermoplastic elastomer, or viton flouroelastomer.

29. The beverage dispenser of claim 26, wherein the tube comprises a coextrusion.

30. The beverage dispenser of claim 26, wherein the retainer comprises polyethylene terephthalate.

31. The beverage dispenser of claim 26, wherein the retainer comprises nylon.

32. The beverage dispenser of claim 26, wherein the tube is selected from the group consisting of a round, oval, square, or polygonal cross-section.

33. The apparatus of claim 26, wherein the retainer comprises a hollow mesh sleeve.

34. An apparatus for dampening pulsations in a fluid flow from a pump outlet to an inlet of a valve in a beverage dispenser, comprising:
a tube for collecting and retaining fluid;
the tube capable of expanding when the fluid pressure increases within the tube;
one end of the tube capable of receiving fluid from a pump outlet and an opposing end of the tube capable of delivering fluid to the inlet of the valve; and
a retainer position around the tube for restricting expansion of the tube when the fluid pressure expands the tube;
the retainer comprising a hollow mesh sleeve.

* * * * *